US007929774B2

(12) United States Patent
Vaughn et al.

(10) Patent No.: US 7,929,774 B2
(45) Date of Patent: Apr. 19, 2011

(54) METHOD OF INFERENTIAL ANALYSIS OF LOW RESOLUTION IMAGES

(75) Inventors: Robert L. Vaughn, Albuquerque, NM (US); Richard P. Maguire, Albuquerque, NM (US); Andrew J. Schiestl, Rio Rancho, NM (US)

(73) Assignee: Intel Corporation, Santa Clara, CA (US)

( * ) Notice: Subject to any disclaimer, the term of this patent is extended or adjusted under 35 U.S.C. 154(b) by 1108 days.

(21) Appl. No.: 11/478,570

(22) Filed: Jun. 28, 2006

(65) Prior Publication Data
US 2008/0002913 A1 Jan. 3, 2008

(51) Int. Cl.
*G06K 9/32* (2006.01)
*G09G 5/02* (2006.01)
(52) U.S. Cl. ............... 382/218; 382/299; 345/698
(58) Field of Classification Search .......... 382/218, 382/217, 276, 299; 345/698, 660; 348/208.5, 348/E3.02, E5.046, 208.2, 208.3, 208.99, 348/E3.021, E7.009; 250/370.09, 309.02, 250/390.11, 208.1, 461.2; 358/444, 1.9; 356/243.1, 318; 378/98.5, 98.12, 98.8, 62; 359/554; 347/5
See application file for complete search history.

(56) References Cited

U.S. PATENT DOCUMENTS

| 4,873,577 | A | * | 10/1989 | Chamzas ................ 382/240 |
| 5,091,780 | A | * | 2/1992 | Pomerleau ................ 348/152 |
| 5,822,392 | A | * | 10/1998 | Hedengren ............ 378/98.8 |
| 6,023,535 | A | * | 2/2000 | Aoki ....................... 382/299 |
| 6,191,772 | B1 | * | 2/2001 | Mical et al. ............ 345/698 |
| 7,003,176 | B1 | * | 2/2006 | Suzuki et al. ........... 382/299 |
| 7,046,862 | B2 | * | 5/2006 | Ishizaka et al. .......... 382/298 |
| 7,447,382 | B2 | * | 11/2008 | Nestares et al. ......... 382/299 |
| 2005/0180636 | A1 | * | 8/2005 | Iizuka ..................... 382/217 |

OTHER PUBLICATIONS

P.B. Van Wamelen, Z. Li, and S.S. Iyengar; A Fast Algorithm For The Point Pattern Matching Problem; Date: Dec. 10, 1999, p. 12.
Haim J. Wolfson, Isidore Rigoutsos; "Geometric Hashing: An Overview"., IEEE Comptational Science and Engeneering. Oct.—Dec. 1997, pp. 10-21.

* cited by examiner

*Primary Examiner* — Sheela C Chawan
(74) *Attorney, Agent, or Firm* — Steven P. Skabrat (57) ABSTRACT

Digital image processing of a low resolution source image to produce a high resolution result image may be accomplished by partitioning the low resolution source image into a plurality of low resolution image parts; for each low resolution image part, comparing the low resolution image part to low resolution reference images to determine at least one most similar low resolution reference image; determining if the most similar low resolution reference images are related to one another; and constructing a high resolution result image based at least in part on high resolution images corresponding to related most similar low resolution reference images.

27 Claims, 8 Drawing Sheets

| Source Image | Library Image | Match |
|---|---|---|
| (1,1)  |  | Yes |
| (2,1)  |  | Yes |
| (3,1)  |  | Yes, 91% |
| (4,1)  |  | Yes, 100% |
| (1,2)  |  | Yes, 90% |
| (2,2)  |  | Yes, 97% |
| (3,2)  |  | Yes, 95% |
| (4,2)  |  | Yes, 95% |

METHOD OF INFERENTIAL ANALYSIS OF LOW RESOLUTION IMAGES

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to image processing and, more specifically, to analysis of a low resolution image.

Many image processing techniques are known. However, processing of low resolution images has been problematic. New approaches to determining a high resolution image matching a low resolution image is desirable.

BRIEF DESCRIPTION OF THE DRAWINGS

The features and advantages of the present invention will become apparent from the following detailed description of the present invention in which.

DETAILED DESCRIPTION

An embodiment of the present invention comprises a method of inferential analysis of a low resolution image to identify or construct a corresponding high resolution image. In some instances, a low resolution image may be difficult to understand or interpret by a user. It may be desirable for the low resolution image to be transformed into a high resolution image because the high resolution image may be more useful to the user. Embodiments of the present invention analyze a low resolution image and infer additional image details based on how well parts of the low resolution image match other low resolution image parts known to be components of a high resolution image.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
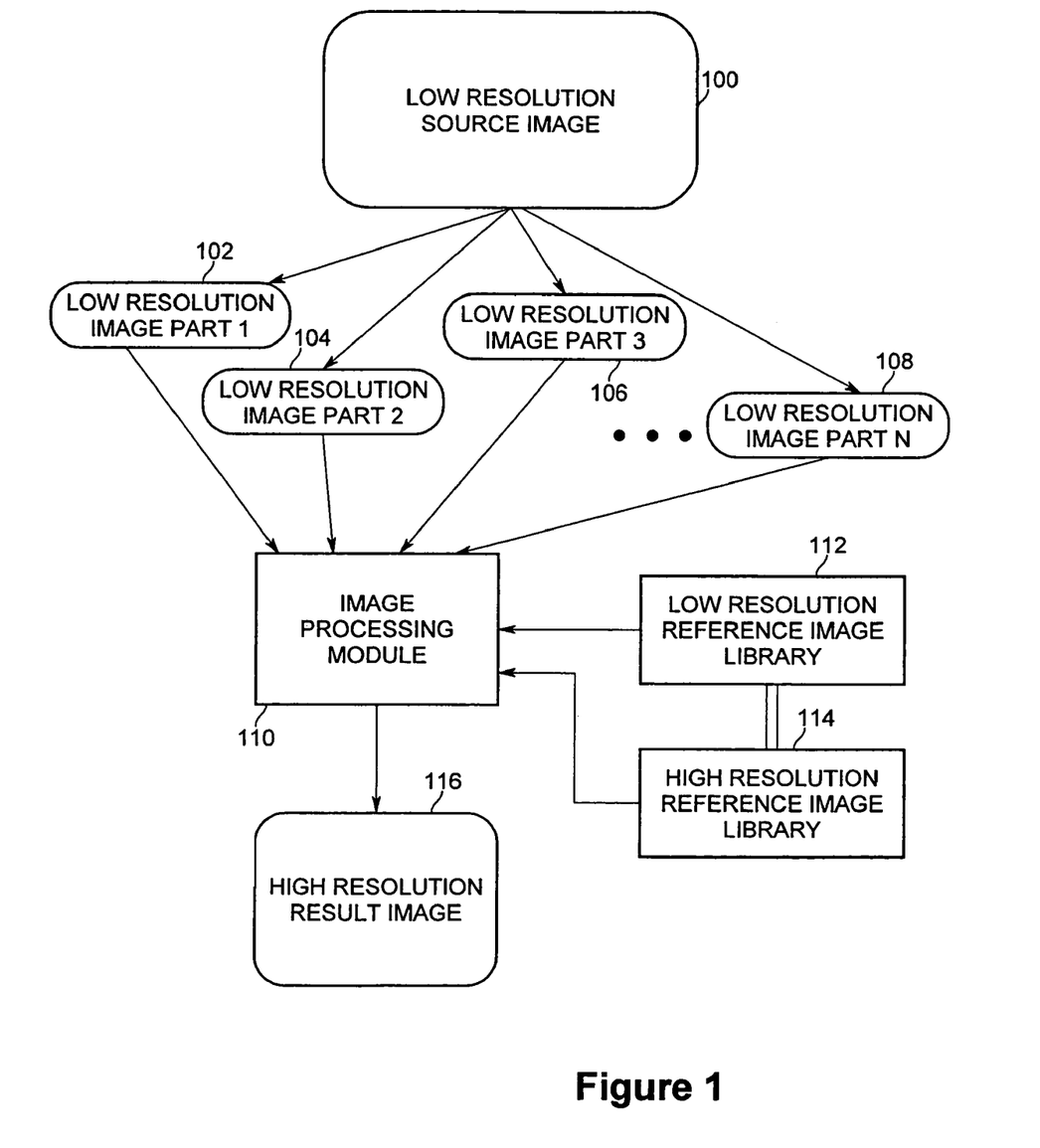
FIG. 1 is a diagram of an image processing system according to an embodiment of the present invention.

FIG. 1 is a diagram of a digital image processing system according to an embodiment of the present invention. A low resolution source image 100 comprises a digitally stored image having a plurality of pixels stored in a memory as is conventionally known. The low resolution source image may be in two dimensions, in a square or rectangular shape, of any size, and having pixels of any number of bits. The low resolution source image may have a low amount of specific detail (e.g., it could be "blocky," pixilated, etc.). An embodiment of the present invention partitions the low resolution source image into a plurality of low resolution image parts. As shown in this simple example, low resolution source image 100 may be divided into N parts, low resolution image part 1 102, low resolution image part 2 104, low resolution image part 3 106, ... low resolution image part N 108, where N is any integer greater than one. Image processing module 110 reads each low resolution image part in turn, and matches the low resolution image part to one or more images in low resolution reference image library 112. Each low resolution image in the low resolution reference image library corresponds to a part of a high resolution image stored in high resolution reference image library 114. By comparing the low resolution image parts to the reference image libraries, the image processing module may inferentially identify or construct a high resolution result image 116 that corresponds to low resolution source image 100. Image processing module 110 may be implemented in software, firmware, hardware, or a combination of software, firmware, and/or hardware, and may be implemented in any digital processing system.

The low resolution reference image library and the high resolution reference image library may be built for specific application domains or contexts. For example, an application domain of text images may result in the libraries having certain reference images representing various fonts. Application domains of aerial photographic images, medical images, facial recognition, or semiconductor wafer images, for example, may each include certain specific reference images. One skilled in the art will recognize that many different application domains may exist for such image processing, and the appropriate reference libraries having the necessary low and high resolution images may be constructed. In various embodiments, any number of images of any size may be stored in the reference libraries (e.g., thousands, tens of thousands, hundreds of thousands, millions, etc.).

Figure 2:
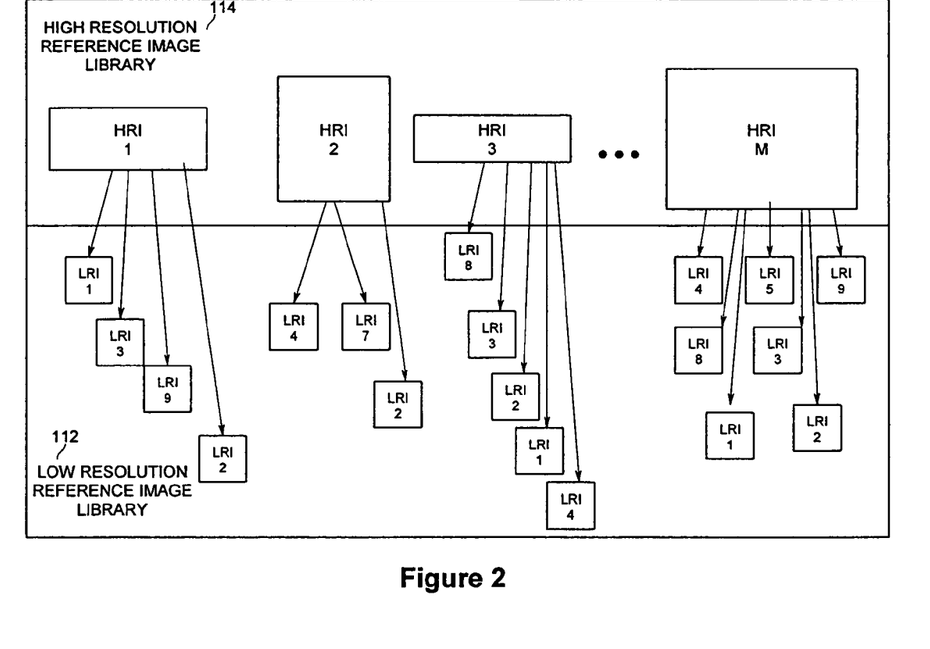
FIG. 2 is a diagram of high resolution images corresponding to low resolution images according to an embodiment of the present invention.

FIG. 2 is a diagram of high resolution images corresponding to low resolution images according to an embodiment of the present invention. Each high resolution image (HRI) in the high resolution reference image library 114 comprises a plurality of low resolution images (LRIs) stored in the low resolution reference image library 112. Although simple examples are shown in FIG. 2, it should be understood that the number of high resolution images in the high resolution reference image library, the number of low resolution images in the low resolution reference image library, and the number of low resolution images comprising any given high resolution image, may be any number. Further, the low resolution images may be collected in any combination or arrangement to form a given high resolution image.

Figure 4:
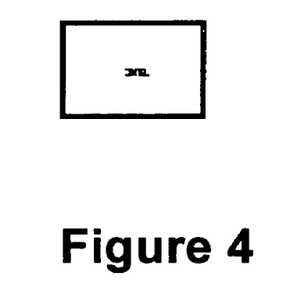
FIG. 4 is an example of a low resolution source image.
Figure 5:
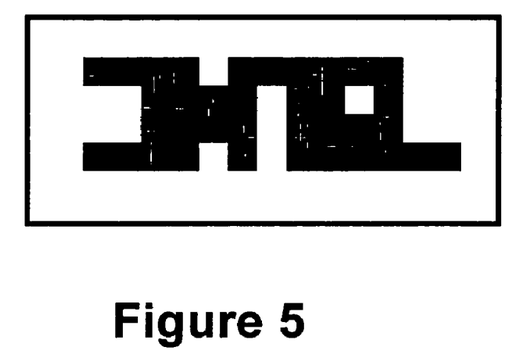
FIG. 5 is a close-up view of the low resolution source image of FIG. 3.

A sample low resolution source image is shown in FIG. 4. Because of its small size and low resolution, the image of FIG. 4 is hard to recognize. The image may be enlarged and "zoomed in" using known image processing tools, as shown in FIG. 5. However, this image does not provide significant detail either and is still hard to recognize. Using embodiments of the present invention, a higher level of detail may be inferred for this low resolution source image.

Figure 3:
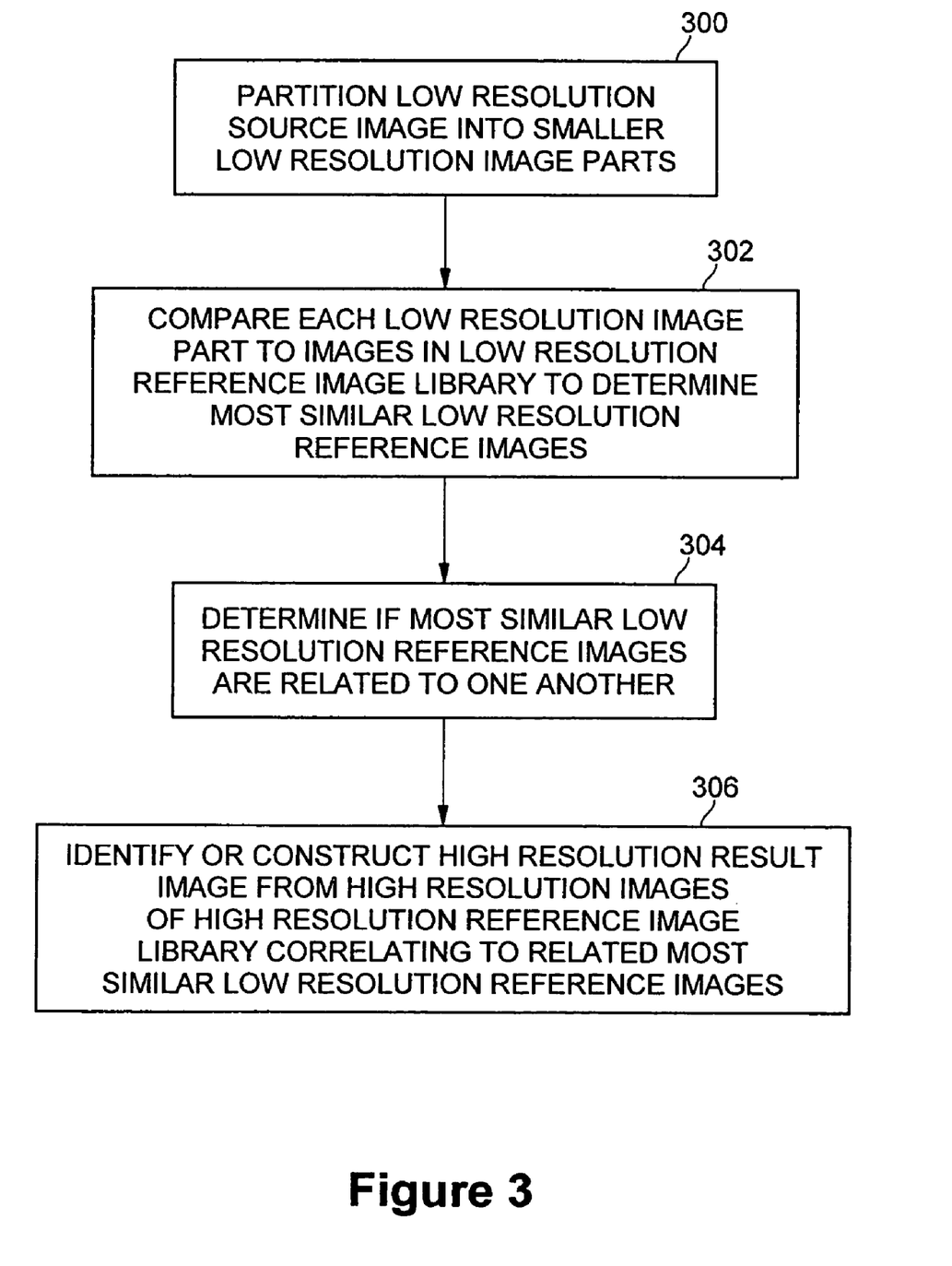
FIG. 3 is a flow diagram illustrating processing of a low resolution source image according to an embodiment of the present invention.

FIG. 3 is a flow diagram illustrating processing of a low resolution source image according to an embodiment of the present invention. Image processing module 110 may perform these operations in identifying or constructing a high resolution result image that corresponds to the low resolution source image. At block 300, low resolution source image 100 may be partitioned into a plurality of smaller low resolution image parts of any shape. This can be seen in the example of FIG. 6. Although a rectangular grid is used in the example of FIG. 6 to partition the low resolution source image into a plurality of rectangular low resolution image parts, any mechanism or technique for partitioning in any shapes or sizes may be used. In one embodiment, the size of the parts after partitioning is the same as the size of the images in the low resolution reference image library.

At block 302, the image processing module 110 compares each low resolution image part (102, 104, 106, ... 108) in turn to images in the low resolution reference image library 112 to determine the most similar low resolution reference images. The method used for comparison of the image may be any one of many known mathematical methods. The actual method used may depend on the implementation details of the images being compared (e.g., black and white or color, and image size being two possible constraints). Approximate matching is a known problem with multiple approaches for solutions. The underlying approach of the matching can vary according to embodiments of the present invention as long as the output of the comparison is a list of matches with the associated probability of the match.

In one embodiment, matching may be approached as the point pattern matching problem. Fundamentally this would treat each low-resolution image as a set of points (which could, but are not required to, go down to the level of individual pixels), and make a comparison between those points. In this embodiment, the probability of a match could be treated as simply as the percentage of points that matched. In this embodiment, the technique which may be used for performing the comparison of a low resolution image part to the images in the low resolution reference image library may be as disclosed in "A Fast Algorithm for the Point Pattern Matching Problem" by Paul B. van Wamelen, Z. Li, and S. S. Iyengar, December 1999.

In another embodiment, the comparison problem could be approached using a geometric hashing solution to more efficiently make the comparison between the low resolution image and the library of low resolution images. The probability of a match here is more complex than the point pattern matching approach, but fundamentally there still would be ordered probabilities of matches. In this embodiment, the techniques described in "Geometric Matching: An Overview" by Wolfson, H. J. and Rigoutsos, I., IEEE Computational Science and Engineering, October-December 1997, pp. 10-21 may be used. In another embodiment, a pixel by pixel comparison of the two images may be made. In another embodiment, the one image may be rotated in comparison to the other image in determining a match. Alternatively, other image comparison techniques known in the art may also be used.

Figure 6:
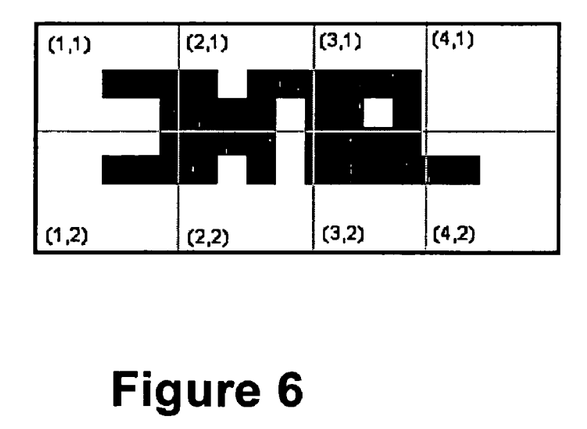
FIG. 6 is the low resolution source image divided into parts according to an embodiment of the present invention.
Figure 7:
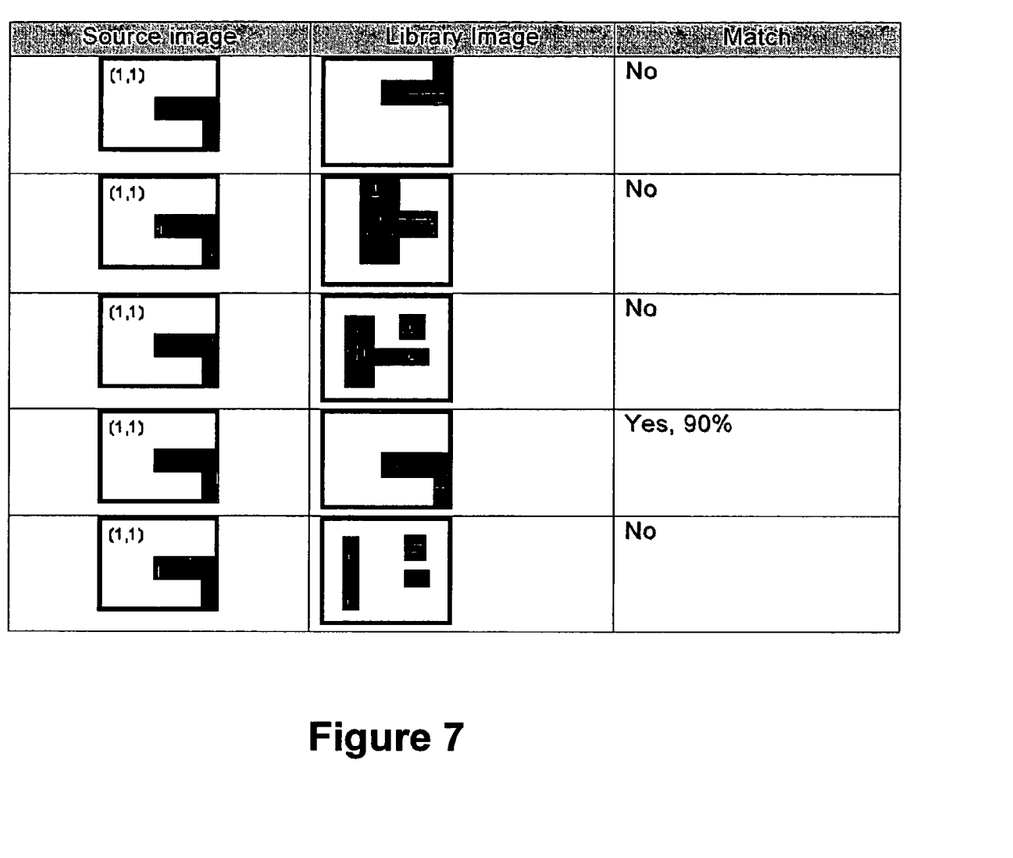
FIG. 7 is a table illustrating low resolution source image parts, low resolution reference images, and match information according to an embodiment of the present invention.

In one example, a first low resolution image part such as the part denoted (1,1) in FIG. 6 may be processed by comparing this image part to each one of a plurality of low resolution reference images from the low resolution reference image library as shown in FIG. 7. FIG. 7 is a table graphically illustrating a low resolution source image part, low resolution reference library images, and match results according to an embodiment of the present invention.

The current low resolution image part may be compared to each one of a plurality of library images. If there is a match, then the match data may be saved in a data structure by the image processing module according to known techniques. For example, the image processing module may store a tuple, for example ((1,1), library image #4), indicating that image #4 is a match. In one embodiment, the comparison processing may return a percentage measurement. In this example, the image processing module determined that the low resolution image part matches the fourth low resolution reference library image in approximately 90% of the pixels. The tuple may be expanded to store the percentage of the match, for example ((1,1), library image #4, 90%). Many different ways of storing the match information are contemplated, and the present invention is not limited in scope in this regard.

Although a simple black and white image is shown in the examples of FIGS. 4-7, it should be understood that color images of any resolution may also be processed according to embodiments of the present invention. After all low resolution image parts have been processed, the image processing module has a list of low resolution image parts, matching low resolution images from the low resolution reference image library, and (optionally) associated percentage match values.

In the example of FIG. 7, the table indicates that there was one match for the low resolution image part currently being processed. The percentage value indicates that it is estimated that 90% of the pixels from the low resolution reference image matched the low resolution image part being checked. There may be multiple matches, each match with different percentages. If multiple matches exist, different techniques for selecting the most likely match may be used. In one embodiment, the match with the highest percentage may be selected. In another embodiment, the matches may be presented to the user and the user may interactively select which match to use. Other selection techniques may also be used.

Figure 8:
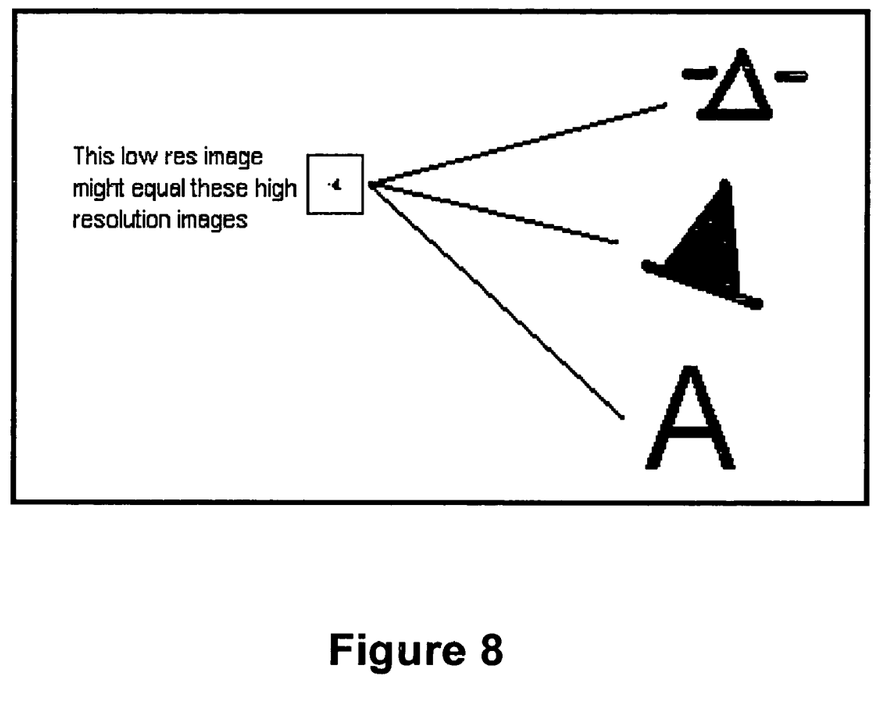
FIG. 8 is a diagram illustrating how a low resolution source image could match several different high resolution images according to an embodiment of the present invention.

This matching activity may be performed for each of the low resolution image parts. At the end of this matching activity, a low resolution source image may be referenced to many (perhaps hundreds) of low resolution reference images that are known to be parts of high resolution reference images. This information may be stored in an appropriate data structure. FIG. 8 is an example diagram illustrating how a low resolution source image (or low resolution image part) could match several different high resolution images according to an embodiment of the present invention, depending on which low resolution reference images are selected.

Figure 9:
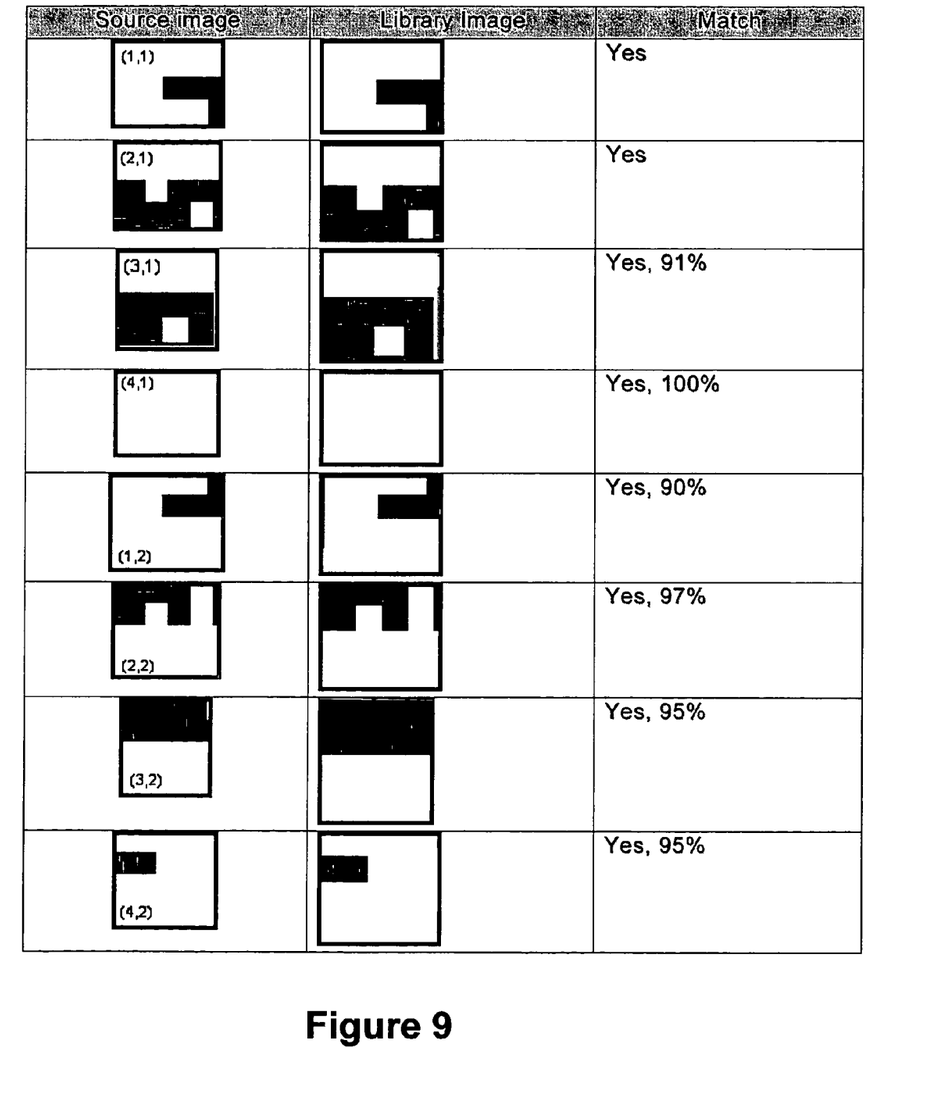
FIG. 9 is a table illustrating low resolution source image parts, low resolution reference images, and match information according to an embodiment of the present invention.

Returning back to FIG. 3, at block 304, the image processing module determines if the most similar low resolution reference images (as determined at block 302) are related to one another. By definition, the low resolution reference images are known to be components of specific high resolution images in the high resolution reference image library (i.e., there is a correlation between the images). Therefore, it can be inferred from matches between low resolution image parts and low resolution reference images that the low resolution image parts may be likely to resolve to a certain high resolution image. FIG. 9 is a table illustrating low resolution source image parts from the sample low resolution source image, matching low resolution reference library images, and match information according to an embodiment of the present invention. This table graphically shows one set of best matches of low resolution image parts and the most similar low resolution reference images (i.e., one possible outcome of the matching processing). There may be many such sets of matches (perhaps hundreds or thousands). However, by rating the success of each individual match (and thus each set of matches) and relating those matches to the relationships of the low resolution reference images to their known high resolution counterparts, then the shapes of the original low resolution source image can be extrapolated with a reasonable degree of certainty. The match information may be stored by the image processing module in an appropriate data structure. In embodiments of the present invention, a most likely high resolution image may thus be inferred from analysis of the low resolution image parts and the related most similar low resolution reference images.

Figure 10:
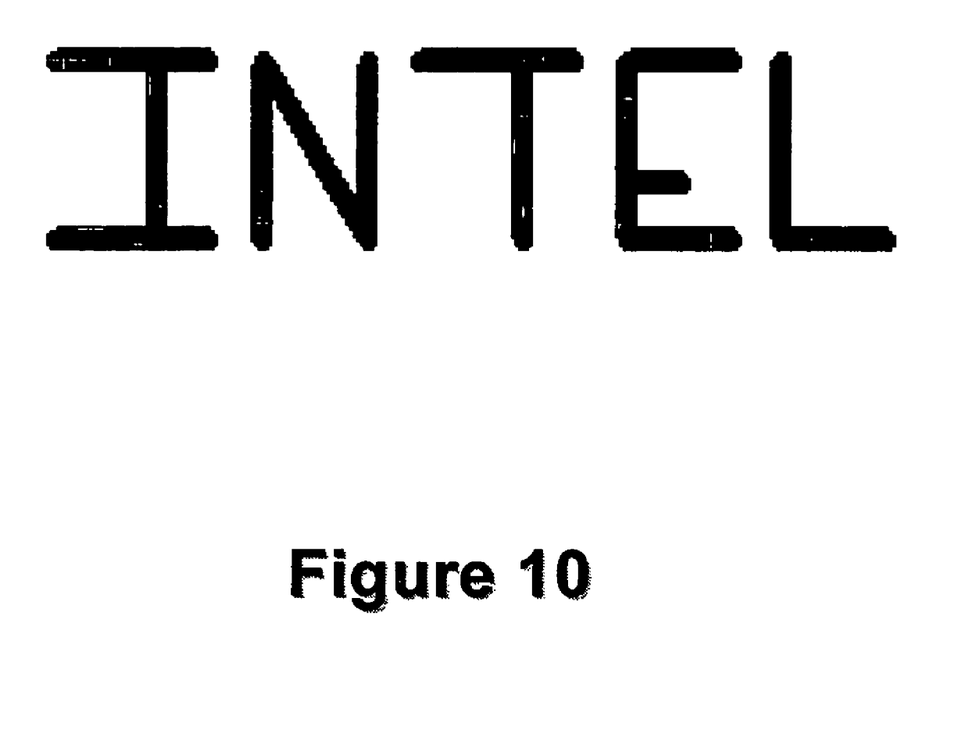
FIG. 10 is an example of a high resolution result image.

At block 306, a high resolution result image may be identified or constructed from the high resolution images of the high resolution reference image library corresponding to the related most similar low resolution images. If the related most similar low resolution images from performing block 304 correlate to a single high resolution reference image, then that image may be returned as the result of the image processing. Otherwise, the high resolution result image may be constructed "on the fly." For each low resolution image part in turn, the image processing module obtains a high resolution image from the high resolution reference image library correlating to a low resolution reference image which best matched the current low resolution image part, and adds that high resolution image as a component of the high resolution result image. In this way the high resolution result image may be pieced together, part by part. FIG. 10 is an example of a high resolution result image as a result of processing a low resolution source image by an embodiment of the present invention.

Table I provides an example of pseudo-code which may be used to implement an embodiment of the present invention.

TABLE I

```
© 2006 Intel Corporation
context = (as an example: aerial photo, wafer analysis, robotic vision)
function (image is loaded)
function (image is divided into N sub-parts)
Perform comparison of image sub-parts to library images
loop (for each N sub-parts)
{
  extract X,Y and color values for image
    store in an Array as (array_image_N)
  loop (for each image in library)
  {
  compare array_image_N to images_in_library
    ### initial comparison
    ## compare via image overlay
    loop
    {
    does pixel X,Y,RGB value of array_image_N == pixel X,Y,RGB value of image_in_library
      switch (result)
      ## pixel is equal
      case 1:
      store result to array_result_N
      ## pixel is not equal
      case 0:
      store result to array_result_N
      ## pixel is approximate value
      case approximate:
      store result to array_result_N
    }
    ## compare via rotated image overlay
    ## rotate image 1 degree per iteration and compare
    loop
    {
    does pixel X,Y,RGB value of array_image_N == picel X,Y,RGB value of image_in_library
      switch (result)
      ## pixel is equal
```

TABLE I-continued

```
      case 1:
      store result to array_result_Nrn
      ## pixel is not equal
      case 0:
      store result to array_result_Nrn
      ## pixel is approximate value
      case approximate:
      store result to array_result_Nrn
    }
  }
  loop (for each array_result_N(XX))
  {
    function (tally [pixel is equal] results)
      function (load to array_tally)
    function (tally [pixel is approximate] results)
      function (load to array_tally)
  }
  function (sort array_tally)
}
Perform comparison of matches to each other
In this section we are attempting to identify images that
that have a library based relationship to each other
Go through each image sub-part that has been processed
loop (for each N sub-parts)
{
  ## compare sub-part Nx with each sub-part Ny array set
  loop (for each other N sub-parts)
  {
    function (does Nx have a relationship with Ny)
    {
    log result to array relation
    }
  }
}
Prepare output of the results for the user
function (sort array_relation)
  function
  (overlay_highest_probablity_image_parts_on_to_low_res_image)
  function (display_to_user)
end
```

Thus, embodiments of the present invention use reference libraries of known low resolution and high resolution images to inferentially construct a high resolution result image providing greater detail based on analysis of a low resolution source image.

Although the operations described herein may be described as a sequential process, some of the operations may in fact be performed in parallel or concurrently. In addition, in some embodiments the order of the operations may be rearranged.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action and produce a result.

What is claimed is:

1. A method of digital image processing of a low resolution source image comprising:
    partitioning, using a processor, the low resolution source image into a plurality of low resolution image parts;
    for each low resolution image part, comparing, using the processor, the low resolution image part to low resolution reference images to determine at least one most similar low resolution reference image;
    determining, using the processor, if the most similar low resolution reference images are related to one another; and
    constructing, using the processor, a high resolution result image based at least in part on high resolution images corresponding to related most similar low resolution reference images;
    wherein determining the most similar low resolution images comprises determining a percentage of pixels from a low resolution image part that match a low resolution reference image.

2. The method of claim 1, wherein constructing the high resolution result image comprises identifying a high resolution image comprising the most similar low resolution images.

3. The method of claim 1, wherein determining the most similar low resolution images comprises selecting a low resolution reference image having the highest percentage of pixels matching the low resolution image part.

4. The method of claim 1, wherein the most similar low resolution images are related to one another if the most similar low resolution images are part of the same high resolution image.

5. The method of claim 1, further comprising storing the low resolution reference images in a low resolution reference image library relating to a specific application domain.

6. The method of claim 1, further comprising storing the high resolution images in a high resolution reference image library relating to a specific application domain.

7. The method of claim 6, wherein the low resolution reference images are components of specific high resolution images in the high resolution reference image library.

8. The method of claim 7, wherein constructing the high resolution result image comprises, for each low resolution image part, obtaining a high resolution image from the high resolution reference image library correlating to a low resolution reference image which best matched the low resolution image part, and adding that high resolution image as a component of the high resolution result image.

9. The method of claim 1, wherein each high resolution image comprises a plurality of low resolution reference images.

10. The method of claim 1, wherein comparing, using the processor, the low resolution image part to low resolution reference images to determine at least one most similar low resolution reference image comprises comparing the low resolution image part to low resolution reference images using a geometric hashing process.

11. The method of claim 1, wherein comparing, using the processor, the low resolution image part to low resolution reference images to determine at least one most similar low resolution reference image comprises comparing the low resolution image part to low resolution reference images by a pixel by pixel comparison.

12. The method of claim 1, wherein comparing, using the processor, the low resolution image part to low resolution reference images to determine at least one most similar low resolution reference image comprises allowing a user to select the most similar low resolution reference image.

13. An article comprising: a non-transitory tangible machine accessible medium containing instructions, which when executed, result in digital image processing of a low resolution source image by
    partitioning the low resolution source image into a plurality of low resolution image parts;
    for each low resolution image part, comparing the low resolution image part to low resolution reference images to determine at least one most similar low resolution reference image;
    determining if the most similar low resolution reference images are related to one another; and
    constructing a high resolution result image based at least in part on high resolution images corresponding to related most similar low resolution reference images;
    wherein instructions to determine the most similar low resolution images comprise instructions to determine a percentage of pixels from a low resolution image part that match a low resolution reference image.

14. The article of claim 13, wherein instructions to construct the high resolution result image comprise instructions to identify a high resolution image comprising the most similar low resolution images.

15. The article of claim 13, wherein instructions to determine the most similar low resolution images comprise instructions to select a low resolution reference image having the highest percentage of pixels matching the low resolution image part.

16. The article of claim 13, wherein the most similar low resolution images are related to one another if the most similar low resolution images are part of the same high resolution image.

17. The article of claim 13, further comprising instructions to store the low resolution reference images in a low resolution reference image library relating to a specific application domain.

18. The article of claim 13, further comprising instructions to store the high resolution images in a high resolution reference image library relating to a specific application domain.

19. The article of claim 18, wherein the low resolution reference images are components of specific high resolution images in the high resolution reference image library.

20. The article of claim 19, wherein instructions to construct the high resolution result image comprise instructions to, for each low resolution image part, obtain a high resolution image from the high resolution reference image library correlating to a low resolution reference image which best matched the low resolution image part, and add that high resolution image as a component of the high resolution result image.

21. The article of claim 13, wherein each high resolution image comprises a plurality of low resolution reference images.

22. A digital image processing system for processing a low resolution source image into a high resolution result image comprising:
- a low resolution reference image library storing a plurality of low resolution reference images relating to a specific application domain;
- a high resolution reference image library storing a plurality of high resolution images relating to the specific application domain; and
- an image processing module adapted to
  - partition the low resolution source image into a plurality of low resolution image parts,
  - for each low resolution image part, compare the low resolution image part to low resolution reference images to determine at least one most similar low resolution reference image;
  - determine if the most similar low resolution reference images are related to one another; and
  - construct a high resolution result image based at least in part on high resolution images corresponding to related most similar low resolution reference images;
- wherein the image processing module is further adapted to determine the most similar low resolution images by determining a percentage of pixels from a low resolution image part that match a low resolution reference image.

23. The system of claim 22, wherein the image processing module is further adapted to construct the high resolution result image by identifying a high resolution image comprising the most similar low resolution images.

24. The system of claim 22, wherein the image processing module is further adapted to determine the most similar low resolution images by selecting a low resolution reference image having the highest percentage of pixels matching the low resolution image part.

25. The system of claim 22, wherein the most similar low resolution images are related to one another if the most similar low resolution images are part of the same high resolution image.

26. The system of claim 22, wherein the low resolution reference images are components of specific high resolution images in the high resolution reference image library.

27. The system of claim 22, wherein the image processing module is further adapted to construct the high resolution result image by, for each low resolution image part, obtaining a high resolution image from the high resolution reference image library correlating to a low resolution reference image which best matched the low resolution image part, and adding that high resolution image as a component of the high resolution result image.

* * * * *